(12) United States Patent
Kunisada et al.

(10) Patent No.: US 6,413,643 B1
(45) Date of Patent: Jul. 2, 2002

(54) SUNLIGHT SHIELDING TRANSLUCENT GLASS PANEL AND SUNLIGHT SHIELDING TRANSLUCENT MULTILAYER GLASS PANEL ASSEMBLY

(75) Inventors: Terufusa Kunisada; Daisuke Arai; Etsuo Ogino, all of Osaka (JP)

(73) Assignee: Nipon Sheet Glass Co., Ltd (JP)

( * ) Notice: Subject to any disclaimer, the term of this patent is extended or adjusted under 35 U.S.C. 154(b) by 0 days.

(21) Appl. No.: 09/240,451

(22) Filed: Jan. 29, 1999

(30) Foreign Application Priority Data

Feb. 6, 1998 (JP) .......................................... 10-041071

(51) Int. Cl.[7] .............................................. B32B 15/04
(52) U.S. Cl. ...................... 428/432; 428/216; 428/433; 428/434; 428/472; 428/701; 428/702; 428/699; 359/360; 359/585; 359/589
(58) Field of Search .................. 428/428, 216, 428/432, 433, 434, 469, 472, 699, 701, 702, 913, 698; 359/360, 585, 589

(56) References Cited

U.S. PATENT DOCUMENTS

| 4,450,201 A | * | 5/1984 | Brill et al. |
|---|---|---|---|
| 4,806,220 A | | 2/1989 | Finley |
| 5,399,435 A | * | 3/1995 | Ando et al. |
| 5,407,733 A | * | 4/1995 | Bjornard et al. |
| 5,411,794 A | * | 5/1995 | Kawaguchi et al. |
| 5,595,825 A | | 1/1997 | Guiselin |
| 5,962,115 A | * | 10/1999 | Zmelty et al. |
| 5,965,246 A | * | 10/1999 | Guiselin et al. |

FOREIGN PATENT DOCUMENTS

| DE | 4422830 | | 1/1995 | |
|---|---|---|---|---|
| EP | 0560534 | | 9/1993 | |
| EP | 636587 A2 | * | 2/1995 | |
| EP | 0638528 | | 2/1995 | |
| EP | 0718250 | | 6/1996 | |
| EP | 0747330 | | 12/1996 | ............ C03C/17/36 |
| GB | 2279365 | | 1/1995 | |
| JP | 7-165442 | | 2/1995 | |
| JP | 8-238710 | | 9/1996 | |
| JP | 8-336928 | | 12/1996 | |

* cited by examiner

Primary Examiner—Deborah Jones
Assistant Examiner—Jennifer McNeil
(74) Attorney, Agent, or Firm—Schwegman, Lundberg, Woessner & Kluth, P.A.

(57) ABSTRACT

A sunlight shielding translucent glass panel has a transparent glass sheet, an absorbing layer disposed on the transparent glass sheet, and transparent dielectric films and mainly Ag films that are alternately arranged on the absorbing layer.

17 Claims, 5 Drawing Sheets

FIG.2 *PRIOR ART*

SUNLIGHT SHIELDING TRANSLUCENT GLASS PANEL AND SUNLIGHT SHIELDING TRANSLUCENT MULTILAYER GLASS PANEL ASSEMBLY

BACKGROUND OF THE INVENTION

1. Field of the Invention:

The present invention relates to a sunlight shielding translucent glass panel having a multilayer film structure including a film composed mainly of silver (Ag), and a sunlight shielding translucent multilayer glass panel assembly which includes such a sunlight-shielding translucent glass panel.

2. Description of the Related Art:

Recent years have seen widespread use of multilayer window glass panes to meet growing demands for highly air-tight, thermally insulated houses. For the purpose of increasing thermal insulating performance and sunlight shielding performance, multilayer glass panes using a glass sheet which has a multilayer film structure including a film composed mainly of Ag are also finding popular use. If multilayer glass panes using a glass sheet which has a multilayer film structure including a mainly Ag film are employed as window glass panes, then the windows have improved thermal insulating performance and sunlight shielding performance. The improved thermal insulating performance cuts down on the cost of heating the house in winter-time, and the improved sunlight shielding performance reduces the cost of cooling the house in summertime.

On conventional glass panel having a multilayer film structure including a mainly Ag film is disclosed in Japanese patent publication No. 7-15143, for example. As shown in FIG. 1 of the accompanying drawings, the disclosed glass panel comprises a transparent glass sheet 11, a first transparent dielectric film 13 disposed on the transparent glass sheet 11, a mainly Ag film 15 disposed on the first transparent dielectric film 13, and a second transparent dielectric film 17 disposed on the mainly Ag film 15. A multilayer film structure composed of the three films 13, 15, 17 will be referred to as a single-Ag-layer LowE film structure.

Another known glass panel having a multilayer film structure including mainly Ag films is also disclosed in Japanese patent publication No. 7-165442. As shown in FIG. 2 of the accompanying drawings, the disclosed glass panel comprises a transparent glass sheet 11, a first transparent dielectric film 13 disposed on the transparent glass sheet 11, a first mainly Ag film 15 disposed on the first transparent dielectric film 13, a second transparent dielectric film 17 disposed on the first mainly Ag film 15, a second mainly Ag film 19 disposed on the second transparent dielectric film 17, and a third transparent dielectric film 21 disposed on the second mainly Ag film 19. A multilayer film structure composed of the five films 13, 15, 17, 19, 21 will be referred to as a double-Ag-layer LowE film structure.

Still another known glass panel having a multilayer film structure including mainly Ag films is disclosed in Japanese patent publication No. 7-149545. As shown in FIG. 3 of the accompanying drawings, the disclosed glass panel comprises a transparent glass sheet 11, a first transparent dielectric film 13 disposed on the transparent glass sheet 11, a first mainly Ag film 15 disposed on the first transparent dielectric film 13, a second transparent dielectric film 17 disposed on the mainly Ag film 15, a second mainly Ag film 19 disposed on the second transparent dielectric film 17, a third transparent dielectric film 21 disposed on the second mainly Ag film 19, a third mainly Ag film 23 disposed on the third transparent dielectric film 21, and a fourth transparent dielectric film 25 disposed on the third mainly Ag film 23. A multilayer film structure composed of the seven films 13, 15, 17, 19, 21, 23, 25 will be referred to as a triple-Ag-layer LowE film structure.

A comparison between the double-Ag-layer LowE film structure and the single-Ag-layer LowE film structure which have the same visible light transmittance indicates that the double-Ag-layer LowE film structure is better than the single-Ag-layer LowE film structure with respect to the sunlight shielding performance. Therefore, a window glass pane which comprises a multilayer glass pane that employs the glass panel with the double-Ag-layer LowE film structure is more effective in suppressing a rise in the indoor temperature than a window glass pane which comprises a multilayer glass pane that employs the glass panel with the single-Ag-layer LowE film structure, whereas both window glass panels ensure substantially the same indoor lightness during the daytime.

A comparison between the triple-Ag-layer LowE film structure and the double-Ag-layer LowE film structure which have the same visible light transmittance indicates that the triple-Ag-layer LowE film structure is better than the double-Ag-layer LowE film structure with respect to the sunlight shielding performance. A window glass pane which comprises a multilayer glass pane that employs the glass panel with the triple-Ag-layer LowE film structure is more effective in suppressing a sunlight-induced rise in the indoor temperature while keeping the room light during the daytime, and also in reducing the load on the air-conditioning unit, than a window glass pane which comprises a multilayer glass pane that employs the glass panel with the double-Ag-layer LowE film structure.

However, the double-Ag-layer LowE film structure is more expensive than the single-Ag-layer LowE film structure as the former has more films than the latter. Similarly, the triple-Ag-layer LowE film structure is more expensive than the double-Ag-layer LowE film structure as the former has more films than the latter.

To make buildings an energy saver, a higher priority is usually given to efforts to reduce the load on the air-conditioning system than to improving the thermal insulating capability. For reducing the air-conditioning system load, there have been widely used heat reflecting glass panels which include one or more layers of a metal oxide, a metal, and a metal nitride on a transparent glass sheet. Such conventional heat reflecting glass panels are highly effective to reduce the air-conditioning system load because they has as good sunlight shielding performance as the triple-Ag-layer LowE film structure.

The sunlight shielding performance of each of the glass panel with the single-Ag-layer LowE film structure and the glass panel with the double-Ag -layer LowE film structure is poorer than the sunlight shielding performance of the conventional heat reflecting glass panels. Therefore, when a multilayer glass pane using a glass panel with the single-Ag-layer LowE film structure or double-Ag-layer LowE film structure are employed as window glass panes, a sunlight-induced rise in the indoor temperature is higher than it is when a heat reflecting glass panel is used as a window glass pane. From the standpoint of the sunlight shielding performance, therefore, it is preferable to use a heat reflecting glass panel as a window glass pane.

However, the visible light transmittance of a heat reflecting glass panel is much lower than the visible light transmittance of a glass panel with the single-Ag-layer LowE film structure, the double-Ag-layer LowE film structure, or the triple-Ag-layer LowE film structure. Therefore, when a heat reflecting glass panel is employed as a window glass pane, the interior room is relatively dark in the daytime, and the window glass pane looks unnatural.

There have already known heat reflecting glass panels that are designed to solve the above problems by reducing the thickness of a metal or metal oxide film for higher visible light transmittance. However, these heat reflecting glass panels with such higher visible light transmittance are necessarily poor in sunlight shielding performance.

The sunlight shielding performance of glass panels with the triple-Ag-layer LowE film structure is of substantially the same level as the sunlight shielding performance of heat reflecting glass panels. However, the glass panels with the triple-Ag-layer LowE film structure are highly expensive to manufacture because of the large number of films, i.e., seven films, required.

SUMMARY OF THE INVENTION

It is therefore an object of the present invention to provide a sunlight shielding glass panel which has higher visible light transmittance than the visible light transmittance of conventional heat reflecting glass panels, and also has sunlight shielding performance that is of substantially the same level as the sunlight shielding performance of conventional glass panels with the triple-Ag-layer LowE film structure or conventional heat reflecting glass panels.

Another object of the present invention to provide a sunlight shielding glass panel which has as small a number of films and which is relatively inexpensive to manufacture.

According to the present invention, there is provided a sunlight shielding translucent glass panel comprising a translucent sheet, an absorbing layer disposed on the translucent sheet, at least one composite layer disposed on the absorbing layer, and an upper transparent dielectric film disposed on the composite layer, the at least one composite layer comprising a transparent dielectric film and a mainly Ag film composed mainly of silver which are successively arranged in the order named from the translucent sheet.

The translucent sheet may comprise a glass sheet which is transparent or semitransparent in a visible light wavelength range or a synthetic resin sheet which is transparent or semitransparent in a visible light wavelength range. The glass sheet may be made of float glass, soda-lime glass, borosilicate glass, crystallized glass, or the like. The synthetic resin sheet may be made of PET (polyethylene terephthalate), PVB (polyvinyl butyral), EVA (ethylene-vinyl acetate copolymer), a cellulose resin, or the like. Generally, the translucent sheet may have a thickness which should range preferably from 0.5 to 10 mm, more preferably from 1 to 5 mm.

The absorbing layer, which is capable of absorbing sunlight to a certain extent, should preferably have a visible light transmittance ranging from 45 to 85%, more preferably from 50 to 80%. Preferably, the absorbing layer comprises a layer of metal nitride having a thickness ranging from 2 to 15 nm, preferably from 3 to 12 nm, or a layer of metal (a single metal or an alloy) having a thickness ranging from 0.3 to 2 nm, preferably from 0.5 to 1.8 nm. The metal nitride may comprise at least one selected from the group consisting of titanium nitride, zirconium nitride, tantalum nitride, and chromium nitride. The metal may comprise at least one selected from the group consisting of chromium, an alloy composed mainly of chromium and nickel, stainless steel, an alloy composed mainly of stainless steel, zinc, niobium, titanium, zirconium, and tungsten.

Each of the transparent dielectric film of the composite layer and the upper transparent dielectric film may comprise a single-layer film selected from the group consisting of a zinc oxide film, a tin oxide film, a silicon nitride film, a titanium oxide film, a zinc oxide film doped with aluminum, and a tin oxide film doped with at least one of antimony and fluorine, or may comprise a laminated film composed of a plurality of films each selected from the above group. These films may be made of different materials or some of these films may be made of one material.

The mainly Ag film may comprise an Ag film or an Ag film which is made of silver and preferably 0.1 to 5%, more preferably 0.1 to 4%, of at least one material selected from the group consisting of palladium, gold, indium, zinc, and tin. The mainly Ag film may have a thickness which should range preferably from 7.5 to 18 nm, and more preferably from 10 to 15 nm.

A protective layer made of titanium oxide or silicon nitride and having a thickness which should range preferably from 5 to 30 nm, more preferably from 10 to 20 nm, may be disposed on a surface of the upper transparent dielectric film remote from the composite layer.

The at least one composite layer may include an additional layer disposed on one or both surfaces of the mainly Ag film. The additional layer may be made of at least one selected from the group consisting of chromium, an alloy composed mainly of chromium and nickel, stainless steel, an alloy composed mainly of stainless steel, zinc, niobium, titanium, zirconium, and tungsten. The additional layer is effective to increase the heat resistance of the mainly Ag film, and also to prevent the mainly Ag film from being oxidized when the transparent dielectric film is grown on the mainly Ag film in an atmosphere containing oxygen. Therefore, the mainly Ag film is effectively prevented from being peeled off due to corrosion, by the additional layer. The additional layer should preferably have a thickness ranging from 0.5 to 3 nm, and more preferably from 0.8 to 1.5 nm.

The at least one composite layer may comprise a first composite layer and a second composite layer which are successively arranged in the order named from the translucent sheet. The mainly Ag films of the first and second composite layers should preferably have a combined thickness ranging from 20 to 30 nm, more preferably 23 to 27 nm. The sunlight shielding translucent glass panel should preferably have a visible light transmittance ranging from 45 to 65%, more preferably from 55 to 65%. The sunlight shielding translucent glass panel should preferably have a sunlight transmittance ranging from 20 to 35%, more preferably from 20 to 30%. In order for the sunlight shielding translucent glass panel to reflect or pass light whose color looks as natural as possible, the transparent dielectric film of the first composite layer should preferably have a thickness ranging from 25 to 50 nm, more preferably 30 to 45 nm, the transparent dielectric film of the second composite layer should preferably have a thickness ranging from 60 to 100 nm, more preferably from 70 to 90 nm, and the upper transparent dielectric film should preferably have a thickness ranging from 30 to 45 nm, more preferably from 34 to 40 nm.

According to the present invention, there is also provided a sunlight shielding translucent multilayer glass panel assembly comprising a sunlight shielding translucent glass panel as described above, and at least one second translucent sheet disposed in confronting relation to the sunlight shielding translucent glass panel. The sunlight shielding translucent glass panel and the at least one second translucent sheet are fixed to each other such that the absorbing layer, the composite layer, and the upper transparent dielectric film are interposed between the translucent sheet of the sunlight shielding translucent glass panel and the at least one second translucent sheet. The second translucent sheet may be made of any of the materials and may have any of the thicknesses which have been referred to above with respect to the translucent sheet of the sunlight shielding translucent glass panel. The second translucent sheet may have a second multilayer film which may be identical to the multilayer film on the translucent sheet of the sunlight shielding translucent glass panel. The second multilayer film should preferably be interposed between the second translucent sheet and the translucent sheet of the sunlight shielding translucent glass panel or another second translucent sheet.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
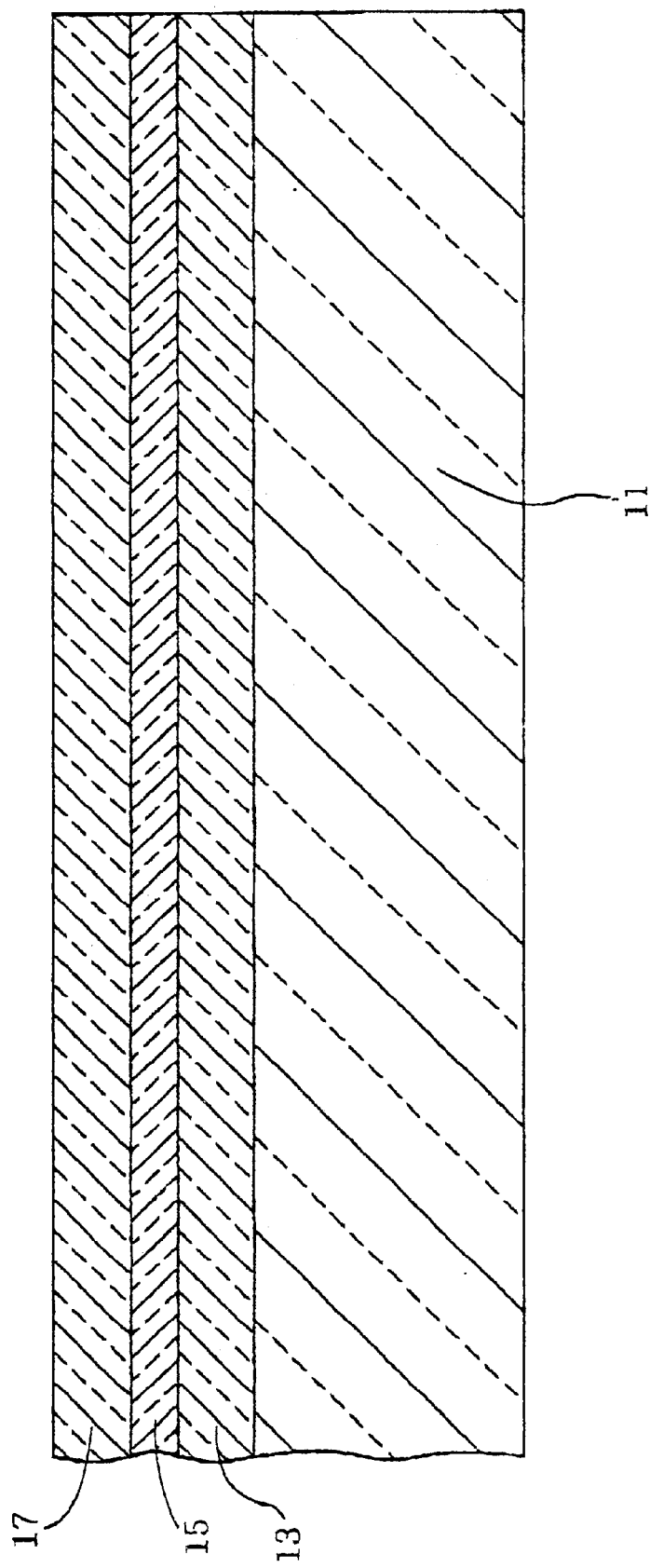
FIG. 1 is a fragmentary cross-sectional view of a conventional glass panel with a single-Ag-layer LowE film structure.
Figure 2:
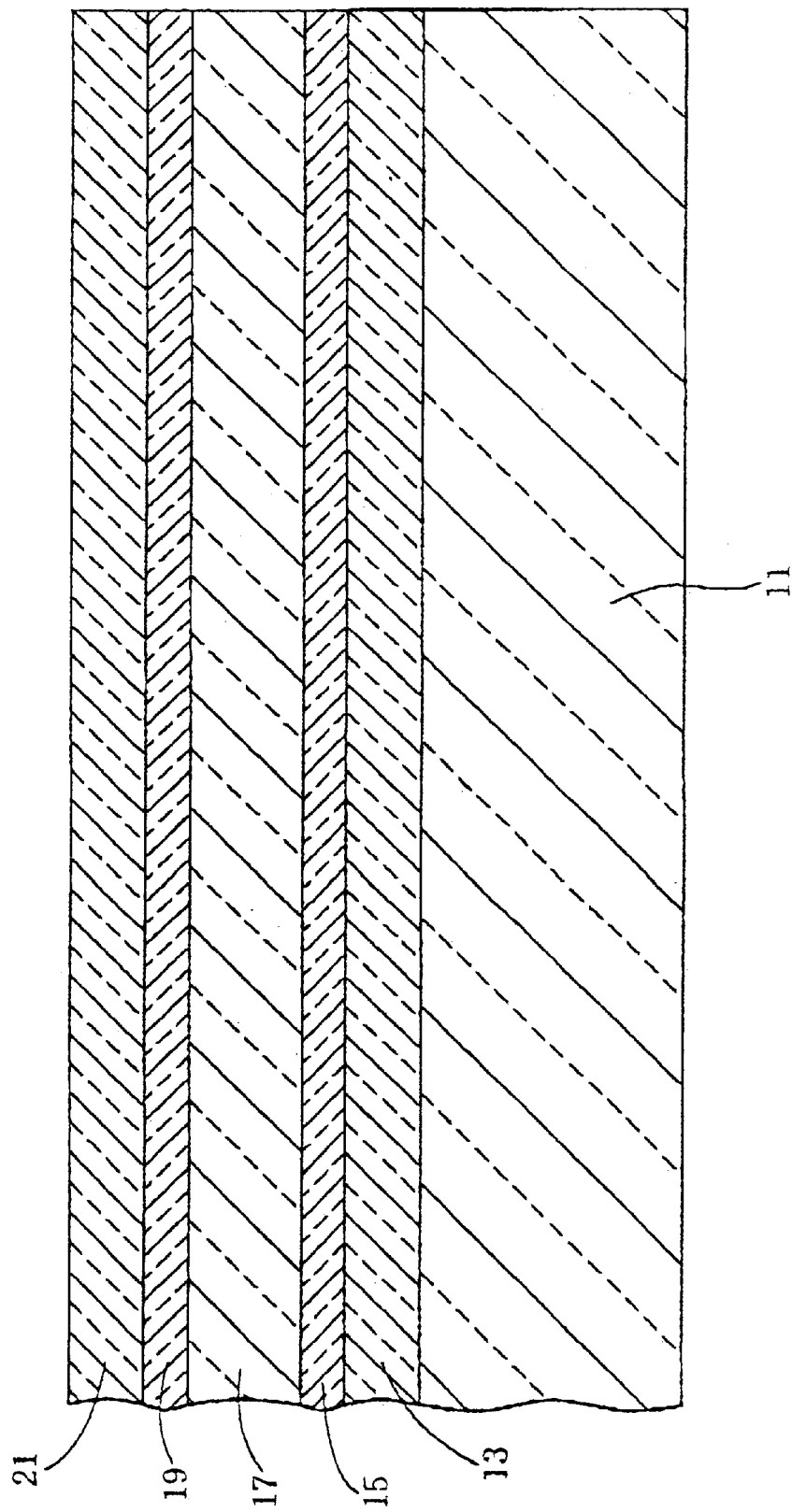
FIG. 2 is a fragmentary cross-sectional view of a conventional glass panel with a double-Ag-layer LowE film structure.
Figure 3:
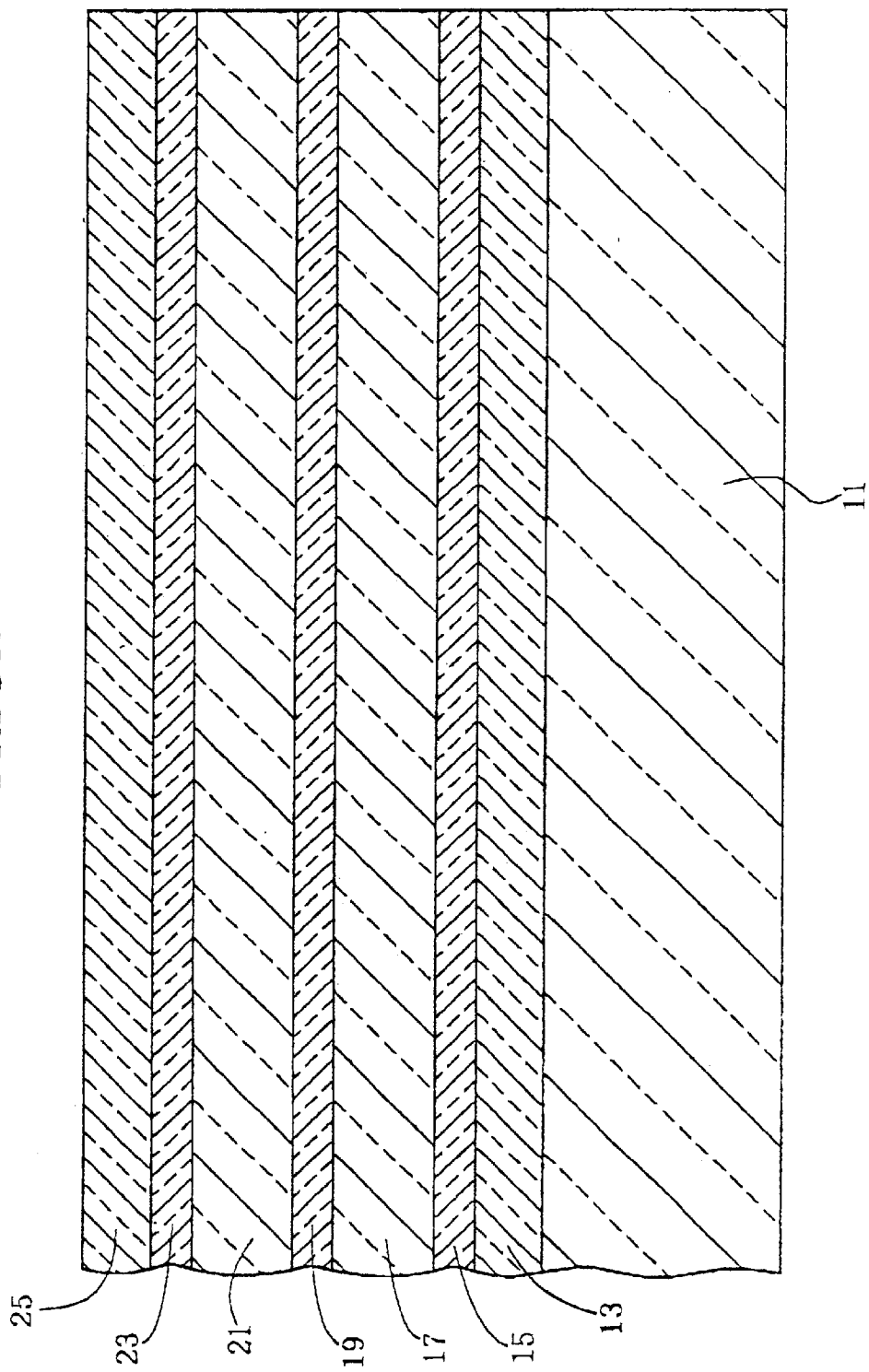
FIG. 3 is a fragmentary cross-sectional view of a conventional glass panel with a triple-Ag-layer LowE film structure.
Figure 4:
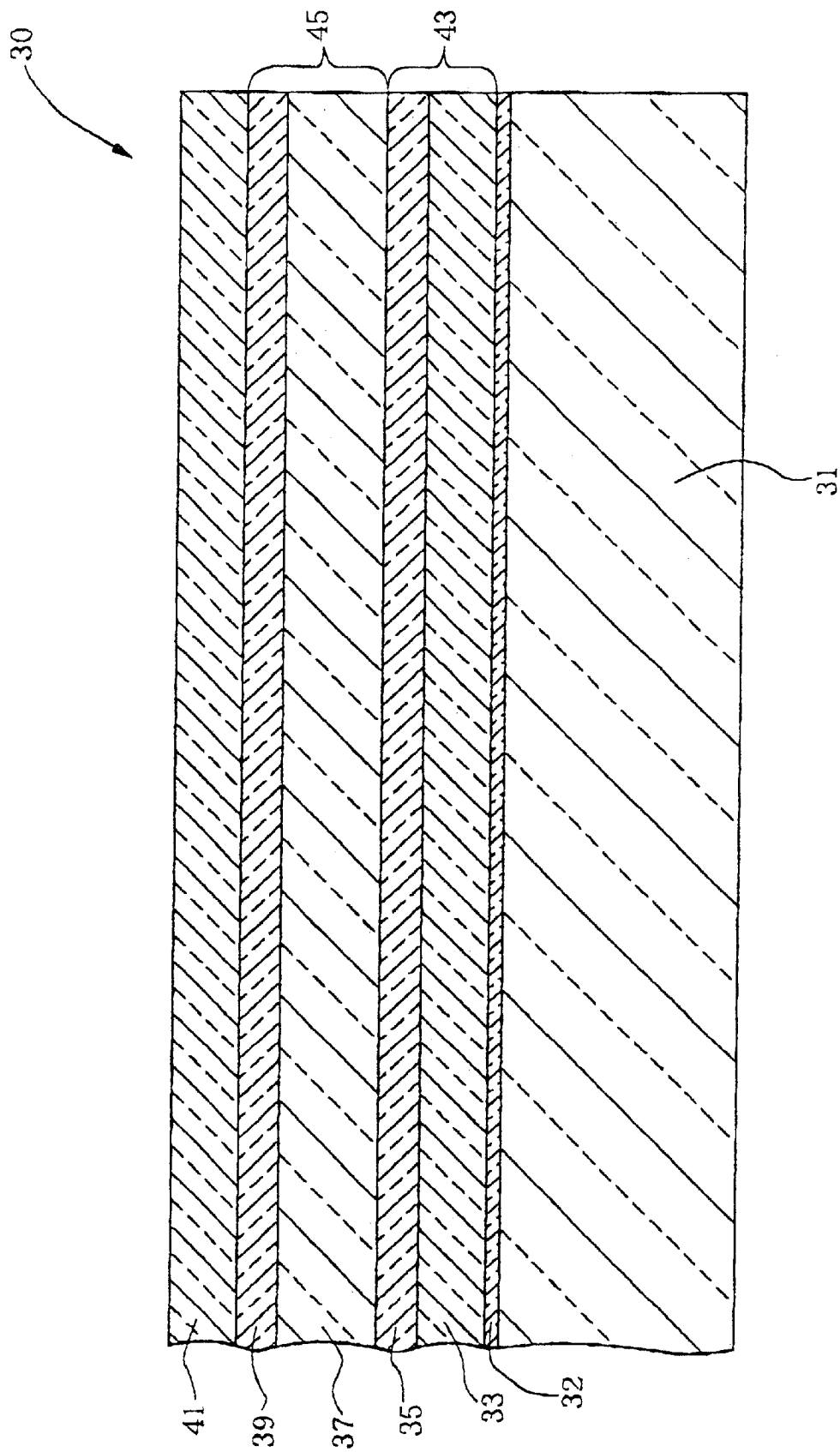
FIG. 4 is a fragmentary cross-sectional view of a sunlight shielding glass panel according to an embodiment of the present invention.

As shown in FIG. 4, a sunlight shielding glass panel 30 according to an embodiment of the present invention comprises a transparent glass sheet 31, an absorbing layer 32 disposed on the transparent glass sheet 31, a first transparent dielectric film 33 disposed on the absorbing layer 32, a first mainly Ag film 35 disposed on the first transparent dielectric film 33, a second transparent dielectric film 37 disposed on the first mainly Ag film 35, a second mainly Ag film 39 disposed on the second transparent dielectric film 37, and a third transparent dielectric film 41 disposed on the second mainly Ag film 39. The first transparent dielectric film 33 and the first mainly Ag film 35 jointly make up a first composite layer 43. The second transparent dielectric film 37 and the second mainly Ag film 39 jointly make up a second composite layer 45. The third transparent dielectric film 41 serves as an upper transparent dielectric film.

Figure 5:
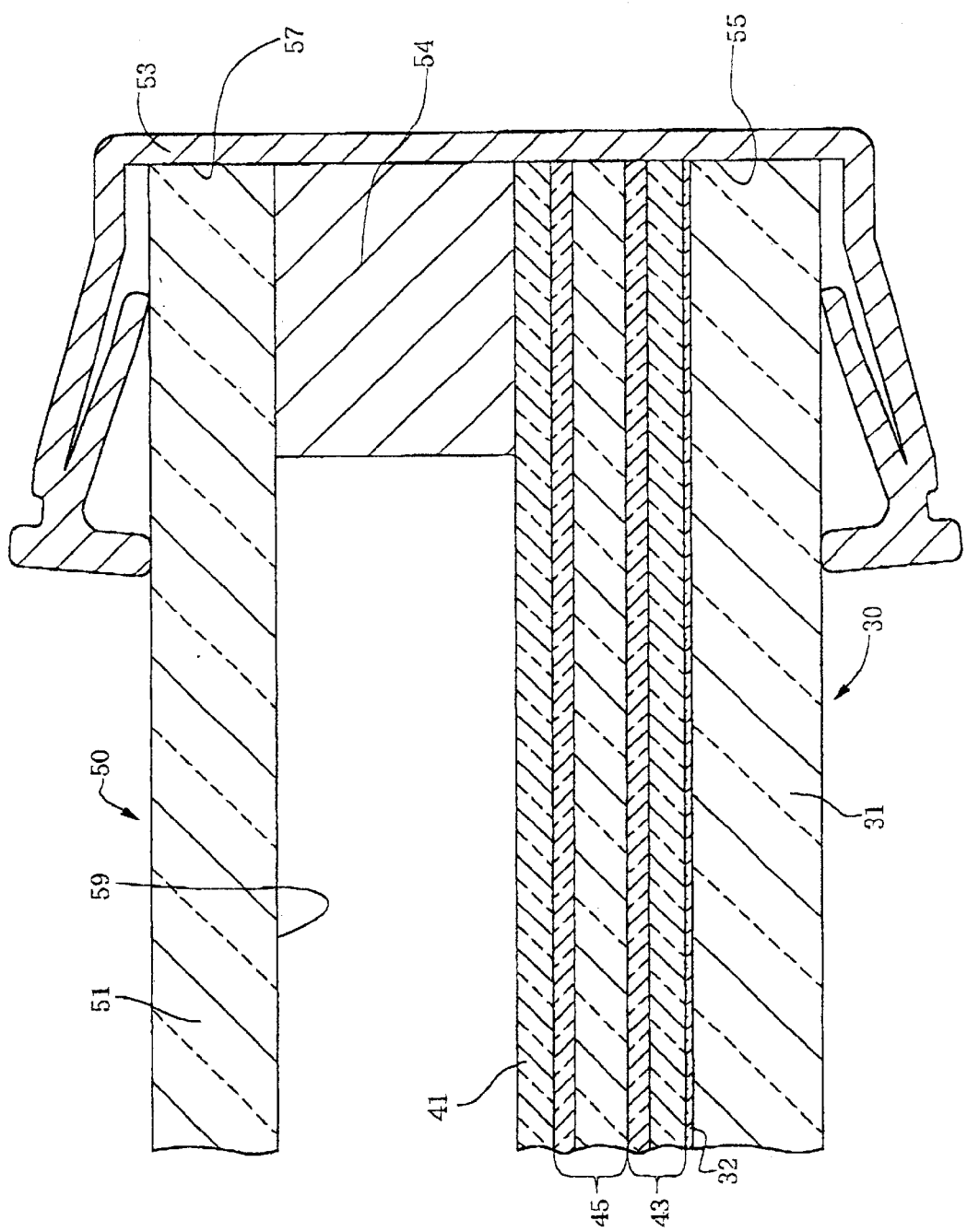
FIG. 5 is a fragmentary cross-sectional view of a sunlight shielding multilayer glass panel assembly according to another embodiment of the present invention, which includes the sunlight shielding glass panel shown in FIG. 4.

As shown in FIG. 5, a sunlight shielding multilayer glass panel assembly 50 according to another embodiment of the present invention comprises the sunlight shielding glass panel 30 shown in FIG. 4, a second transparent glass sheet 51 extending parallel to and spaced from the sunlight shielding glass panel 30, a glazing channel 53 of substantially U-shaped cross section which is made of synthetic resin, metal, or rubber, extending around edges of the sunlight shielding glass panel 30 and the second transparent glass sheet 51, and a spacer 54 of rectangular cross section which is made of aluminum or the like, disposed between the edges of the sunlight shielding glass panel 30 and the second transparent glass sheet 51. The glazing channel 53 has an attachment groove 55 receiving therein the edges of the sunlight shielding glass panel 30 and the second transparent glass sheet 51 and the spacer 54 positioned therebetween. The second transparent glass sheet 51 is kept parallel to and laterally spaced from the sunlight shielding glass panel 30 by the spacer 54 by a distance of 6 mm, for example.

The absorbing layer 32, the first and second composite layers 43, 45, and the upper transparent dielectric film 41 are interposed between the transparent glass sheet 31 and the second transparent glass sheet 51. A dry air layer 59 is present in a space created between the sunlight shielding glass panel 30 and the second transparent glass sheet 51 by the spacer 54. The dry air layer 59 may be replaced with a vacuum layer or a transparent resin film. If a transparent resin film is present in the space between the sunlight shielding glass panel 30 and the second transparent glass sheet 51, then the sunlight shielding glass panel 30 and the second transparent glass sheet 51 are bonded to each other by the transparent resin film. Therefore, the sunlight shielding multilayer glass panel assembly 50 serves as a laminated glass panel assembly. With the transparent resin film used, the glazing channel 53 and the spacer 54 may be dispensed with. The transparent resin film may be made of a resin selected from the group consisting of a polyvinyl alcohol such as polyvinyl butyral, a vinyl acetate such as polyvinyl acetate, thermoplastic polyurethane, and polyvinyl chloride.

Inventive Examples and Comparative Examples of the sunlight shielding glass panel 30 and a method of manufacturing the sunlight shielding glass panel 30 will be described below.

INVENTIVE EXAMPLE 1

Using an in-line sputtering apparatus comprising a preliminary evacuating chamber and a sputtering chamber, a sunlight shielding film structure composed of an absorbing layer 32, first and second composite layers 43, 35, and an upper transparent dielectric film 41 was grown on a transparent glass sheet 30 as follows:

Four cathodes were present in the sputtering chamber. Targets of chromium (Cr), tin (Sn), zinc (Zn), and silver (Ag) were set respectively on the four cathodes. The sputtering chamber was evacuated to $5 \times 10^{-4}$ Pa (Pascal) or lower by a rotary pump and a cryopump. Then, a glass sheet 31 comprising a colorless transparent float glass having a thickness of 3 mm was cleaned and placed in the auxiliary evacuating chamber, which was then evacuated to 0.3 Pa or lower. Then, the glass sheet 31 was transferred into the sputtering chamber.

An argon (Ar) gas was introduced into the sputtering chamber at a rate of 100 SCCM (Standard Cubic Centimeters per Minute) to adjust the pressure in the sputtering chamber to 0.3 Pa. The cathode with the target of Cr was energized by a DC power supply to produce an electric discharge, and the current flowing to the cathode was adjusted to 1 A (Ampere). The voltage applied to the cathode was about 250 V. By passing the glass sheet 31 over the target of Cr, an absorbing layer 32 comprising a chromium film having a thickness of 1.8 nm was deposited on the glass sheet 31.

Then, after the sputtering chamber was evacuated again to $5 \times 10^{-4}$ Pa, an $O_2$ gas was introduced into the sputtering chamber at a rate of 100 SCCM to adjust the pressure in the sputtering chamber to 0.3 Pa. The cathode with the target of Sn was energized by a DC power supply to produce an electric discharge. The glass sheet 31 was passed over the target of Sn, whereupon a lower layer of a first transparent dielectric film 33, comprising a tin oxide film having a thickness of 34 nm, was deposited on the glass sheet 31. Then, the cathode with the target of Zn was energized by a DC power supply to produce an electric discharge. The glass sheet 31 was passed over the target of Zn, whereupon an upper layer of the first transparent dielectric film 33, comprising a zinc oxide film having a thickness of 8.5 nm, was deposited on the glass sheet 31. The zinc oxide film and the tin oxide film formed there-beneath jointly serve as the first transparent dielectric film 33.

Then, after the sputtering chamber was evacuated again to $5 \times 10^{-4}$ Pa, an argon gas was introduced into the sputtering chamber at a rate of 100 SCCM to adjust the pressure in the sputtering chamber to 0.3 Pa. The cathode with the target of Ag was energized by a DC power supply to produce an electric discharge. The glass sheet 31 was passed over the target of Ag, whereupon a first mainly Ag film 35 having a thickness of 8.9 nm, was deposited on the glass sheet 31. Thereafter, a first additional layer comprising a zinc film having a thickness of 1 nm was formed in the same manner as the zinc oxide film was formed as the upper layer of the first transparent dielectric film 33, except for a different atmosphere developed in the sputtering chamber. This thin zinc film as the first additional layer was formed to prevent the silver surface of the first mainly Ag film 35 from being oxidized when a zinc oxide layer would subsequently be formed as a lower layer of a second transparent dielectric film 37, as described below. When the zinc oxide layer would be formed later, the thin zinc film would be oxidized into a zinc oxide film that would substantially be united with the zinc oxide layer subsequently formed as a lower layer of a second transparent dielectric film 37.

Substantially in the same manner as with the first transparent dielectric film 33, a lower layer comprising a zinc oxide film having a thickness of 8.5 nm, an intermediate layer comprising a tin oxide film having a thickness of 68.2 nm, and an upper layer comprising a zinc oxide film having a thickness of 8.5 nm were successively formed. These lower, intermediate, and upper layers jointly made up a second transparent dielectric film 37. Then, in the same manner as with the first mainly Ag film 35, a second mainly Ag film 39 comprising a silver film having a thickness of 12.7 nm was formed. Thereafter, a second additional layer comprising a zinc film having a thickness of 1 nm was formed in the same manner as with the first additional layer. The thin zinc film as the second additional layer was formed to prevent the silver surface of the second mainly Ag film 39 from being oxidized when a zinc oxide layer would subsequently be formed as a lower layer of a third transparent dielectric film 41, as described below. When the zinc oxide layer would be formed later, the thin zinc film would be oxidized into a zinc oxide film that would substantially be united with the zinc oxide layer subsequently formed as a lower layer of a third transparent dielectric film 41.

In the same manner as with the first transparent dielectric film 33 except that upper and lower layers are inverted, a lower layer comprising a zinc oxide film having a thickness of 8.5 nm and an upper layer comprising a tin oxide film having a thickness of 34.2 nm were formed, thus forming a third transparent dielectric film (upper transparent dielectric film) 41 composed of the zinc oxide film and the tin oxide film.

The structural details of the sunlight shielding glass panel 30 of Inventive Example 1 thus produced are shown in Table 1 below. The sunlight shielding glass panel 30 was measured by a spectrophotometer for various transmission spectrums thereof, a reflection spectrum of the coated surface (where the sunlight shielding film structure of the sunlight shielding glass panel 30 is formed), and a reflection spectrum of the uncoated surface (where the sunlight shielding film structure of the sunlight shielding glass panel 30 is not formed). These measured results were applied to JIS R 3106-1985 (the method of testing the transmittance, reflectivity, and sunlight heat acquisition ratio of sheet glass according to the Japan Industrial Standards), thus calculating a visible light transmittance of the sunlight shielding glass panel 30, an uncoated surface visible light reflectivity of the sunlight shielding glass panel 30, and a sunlight transmittance of the sunlight shielding glass panel 30. The calculated results are shown in Table 2 below. The visible light transmittance and the sunlight transmittance shown in Table 2 are given as defined by JIS R 3106-1985. A selective transmittance performance value given in Table 2 is an index indicative of the selective transmittance performance, and is defined according to the following equation:

Selective transmittance performance value=sunlight transmittance/visible light transmittance.

An infrared reelection characteristic of the coated surface was measured and applied to JIS R 3106-1985, thus calculating a reflectivity.

A sunlight shielding multilayer glass panel assembly 50 as shown in FIG. 5 was produced, using the sunlight shielding glass panel 30 whose reflection spectrum of the coated surface, reflection spectrum of the uncoated surface, and reflectivity were measured, as an exterior glass panel with the coated surface facing inwardly. A second glass sheet 51 comprising a colorless transparent float glass having a thickness of 3 mm was installed as an interior glass panel spaced from the sunlight shielding glass panel 30 by a dry air layer 59 having a thickness of 6 mm. The sunlight shielding multilayer glass panel assembly 50 was measured for a visible light transmittance, an exterior visible light reflectivity, and a sunlight heat acquisition ratio, which are shown in Table 3 below. In FIG. 5, a space above the second glass sheet 51 serves as an interior space, and a space below the sunlight shielding glass panel 30 as an exterior space.

As shown in Table 3, the sunlight shielding multilayer glass panel assembly 50 according to Inventive Example 1 has a high visible transmittance of 42.40%, and the exterior scenery as seen from the interior room through the sunlight shielding multilayer glass panel assembly 50 is natural, with the interior room being sufficiently light. The sunlight shielding multilayer glass panel assembly 50 according to Inventive Example 1 as seen from the exterior has a light green appearance, giving the exterior observer looking at the sunlight shielding multilayer glass panel assembly a neat impression about the appearance. The sunlight shielding multilayer glass panel assembly 50 has a sufficiently low sunlight heat acquisition ratio of 0.329, which is substantially the same as the sunlight heat acquisition ratio of a similar conventional multilayer glass panel with the triple-Ag-layer LowE film structure.

INVENTIVE EXAMPLES 2–7

Sunlight shielding glass panels 30 according to Inventive Examples 2–7 were made in the same manner as with Inventive Example 1. The structural details of the sunlight shielding glass panels 30 thus produced are shown in Table 1. Visible light transmittances, uncoated surface visible light reflectivities, and sunlight transmittances of the sunlight shielding glass panels 30 according to Inventive Examples 2–7, which were calculated in the same manner as with the sunlight shielding glass panel 30 according to Inventive Example 1, are shown in Table 2. Visible light transmittances, exterior visible light reflectivities, and sunlight heat acquisition ratios which were calculated for sunlight shielding multilayer glass panel assemblies 50 using the sunlight shielding glass panels 30 according to Inventive Examples 2–7 in the same manner as with the sunlight shielding multilayer glass panel assembly 50 using the sunlight shielding glass panel 30 according to Inventive Example 1, are shown in Table 3.

As shown in Table 2, the visible light transmittances of the sunlight shielding glass panels 30 according to Inventive Examples 2–7 are 45% or higher, and their sunlight transmittances are 35% or lower. Therefore, the visible light transmittances of the sunlight shielding glass panels 30 according to Inventive Examples 2–7 are higher than those of the conventional heat reflecting glass panels, and their sunlight transmittances are substantially the same as that of the glass panel with the triple-Ag-layer LowE film structure. The total number of films of the sunlight shielding films of each of the sunlight shielding glass panels 30 according to Inventive Examples 2–7 is small, e.g., six, so that it is relatively inexpensive to manufacture the sunlight shielding glass panels 30 according to Inventive Examples 2–7.

As shown in Table 3, the visible light transmittances of the sunlight shielding multilayer glass panel assemblies 50 using the sunlight shielding glass panels 30 according to Inventive Examples 2–7 are higher than 40%, and the exterior scenery seen through these sunlight shielding multilayer glass panel assemblies 50 is natural, with the interior side being sufficiently light. The sunlight shielding multilayer glass panel assemblies 50 using the sunlight shielding glass panels 30 according to Inventive Examples 2 through 7 as seen from the exterior have a colorless or light green appearance, giving the exterior observer a neat impression about the appearance. These sunlight shielding multilayer glass panel assemblies 50 have a sufficiently low sunlight heat acquisition ratio of less than 0.40, which is much lower than the sunlight heat acquisition ratio of a similar conventional multilayer glass panel with the double-Ag-layer LowE film structure.

Comparative Examples for comparison with Inventive Examples 1 through 7 will be described below.

COMPARATIVE EXAMPLE 1

The thicknesses of films of a sunlight shielding glass panel according to Comparative Example 1, which was produced in the same manner as with Inventive Example 1, are shown in Table 1. A visible light transmittance, an uncoated surface visible light reflectivity, and a sunlight transmittance of the sunlight shielding glass panel according to Comparative Example 1, which were calculated in the same manner as with the sunlight shielding glass panel according to Inventive Example 1, are shown in Table 2. A visible light transmittance, an exterior visible light reflectivity, and a sunlight heat acquisition ratio which were calculated for a sunlight shielding multilayer glass panel assembly using the sunlight shielding glass panel according to Comparative Example 1 in the same manner as with the sunlight shielding multilayer glass panel assembly using the sunlight shielding glass panel according to Inventive Example 1, are shown in Table 3.

As shown in Table 2, the sunlight shielding glass panel according to Comparative Example 1 has a very high visible light transmittance of 77.5% and a low uncoated surface visible light reflectivity which is 5.8%. As shown in Table 3, the sunlight shielding multilayer glass panel assembly using the sunlight shielding glass panel according to Comparative Example 1 has a high visible light transmittance of 68.5% and also a high sunlight heat acquisition ratio of 0.44. The sunlight heat acquisition ratio of the sunlight shielding multilayer glass panel assembly is higher than those of the conventional heat reflecting glass panels, and hence the thermal insulating performance thereof is poorer.

COMPARATIVE EXAMPLE 2

Using an in-line sputtering apparatus comprising a preliminary evacuating chamber and a sputtering chamber, an infrared reflecting film was grown on a transparent glass sheet as follows:

Two cathodes were present in the sputtering chamber. Targets of stainless steel and titanium (Ti) were set respectively on the two cathodes. The sputtering chamber was evacuated to $5\times10^{-4}$ Pa or lower by a rotary pump and a cryopump. Then, a glass sheet comprising a colorless transparent float glass sheet having a thickness of 3 mm was cleaned and placed in the auxiliary evacuating chamber, which was then evacuated to 0.3 Pa or lower. Then, the glass sheet was transferred into the sputtering chamber.

An Ar gas was introduced into the sputtering chamber at a rate of 50 SCCM to adjust the pressure in the sputtering chamber to 0.3 Pa. The cathode with the target of stainless steel was energized by a DC power supply to produce an electric discharge, and the current flowing to the cathode was adjusted to 3 A. The voltage applied to the cathode was about 410 V. By passing the glass sheet over the target of stainless steel, a stainless steel film having a thickness of 6.0 nm was deposited as a first layer on the glass sheet.

Then, after the sputtering chamber was evacuated again to $5\times10^{-4}$ Pa, an $O_2$ gas was introduced into the sputtering chamber at a rate of 50 SCCM to adjust the pressure in the sputtering chamber to 0.3 Pa. The cathode with the target of Ti was energized by a DC power supply to produce an electric discharge. The glass sheet was passed over the target of Ti, whereupon a titanium oxide film having a thickness of 10.0 nm was deposited as a second layer on the glass sheet 31.

The thicknesses of the films of the sunlight shielding glass panel according to Comparative Example 2, which was thus produced, are shown in Table 1. A visible light transmittance, an uncoated surface visible light reflectivity, and a sunlight transmittance of the sunlight shielding glass panel according to Comparative Example 2, which were calculated in the same manner as with the sunlight shielding glass panel according to Inventive Example 1, are shown in Table 2. A visible light transmittance, an exterior visible light reflectivity, and a sunlight heat acquisition ratio which were calculated for a sunlight shielding multilayer glass panel assembly using the sunlight shielding glass panel according to Comparative Example 2 in the same manner as with the sunlight shielding multilayer glass panel assembly using the sunlight shielding glass panel according to Inventive Example 1, are shown in Table 3.

As shown in Table 3, the sunlight shielding multilayer glass panel assembly using the sunlight shielding glass panel according to Comparative Example 2 has a low sunlight heat acquisition ratio of 0.38 for excellent sunlight shielding performance, but has a low visible light transmittance of 28.6%. As shown in Table 3, when the sunlight shielding multilayer glass panel assembly using the sunlight shielding glass panel according to Comparative Example 2 is used as a window glass pane, the interior room is relatively dark in the daytime, the exterior scenery as seen from the interior room looks dark, giving the exterior observer looking at the sunlight shielding multilayer glass panel assembly a neat impression about the appearance.

COMPARATIVE EXAMPLE 3

The thicknesses of films of a sunlight shielding glass panel according to Comparative Example 3, which was produced in the same manner as with Inventive Example 1, are shown in Table 1. A visible light transmittance, an uncoated surface visible light reflectivity, and a sunlight transmittance of the sunlight shielding glass panel according to Comparative Example 3, which were calculated in the same manner as with the sunlight shielding glass panel according to Inventive Example 1, are shown in Table 2. A visible light transmittance, an exterior visible light reflectivity, and a sunlight heat acquisition ratio which were calculated for a sunlight shielding multilayer glass panel assembly using the sunlight shielding glass panel according to Comparative Example 3 in the same manner as with the sunlight shielding multilayer glass panel assembly using the sunlight shielding glass panel according to Inventive Example 1, are shown in Table 3.

As shown in Table 3, the sunlight shielding multilayer glass panel assembly using the sunlight shielding glass panel according to Comparative Example 3 has a low sunlight heat acquisition ratio of 0.38 which is substantially the same as those of the conventional heat reflecting glass panels, and has a high visible light transmittance of 65.3%. When the sunlight shielding multilayer glass panel assembly using the sunlight shielding glass panel according to Comparative Example 3 is used as a window glass pane, resulting in an excellent reduction in the load on the air-conditioning system. The interior room is light in the daytime, and the exterior observer looking at the sunlight shielding multilayer glass panel assembly is given a neat impression about the appearance. However, since the total number of the films of the sunlight shielding glass panel according to Comparative Example 3 is large, i.e., seven, it is very expensive to manufacture the sunlight shielding glass panel according to Comparative Example 3 as compared with the advantages offered thereby. Consequently, the sunlight shielding glass panel according to Comparative Example 3 is not appropriate as consumer products.

TABLE 1

| | Glass sheet | 1st layer | 2nd layer | 3rd layer | 4th layer | 5th layer | 6th layer | 7th layer |
|---|---|---|---|---|---|---|---|---|
| In. Ex. | | | | | | | | |
| 1 | 3 nm FL | Cr 1.8 nm | $SnO_2$/ZnO 42.5 nm | Ag 8.9 nm | ZnO/$SnO_2$/ZnO 85.2 nm | Ag 12.7 nm | ZnO/$SnO_2$ 42.7 nm | |
| 2 | 3 nm FL | Cr 1.6 nm | ZnO 38.8 nm | Ag 8.1 nm | ZnO 85.9 nm | Ag 12.6 nm | ZnO 42.5 nm | |
| 3 | 3 nm FL | Cr 1.4 nm | $SnO_2$/ZnO 29.7 nm | Ag 9.3 nm | ZnO/$SnO_2$/ZnO 89.0 nm | Ag 12.6 nm | ZnO/$SnO_2$ 42.0 nm | |
| 4 | 3 nm FL | Ti 0.7 nm | ZnO 39.4 nm | Ag 9.6 nm | ZnO 92.0 nm | Ag 17.3 nm | ZnO/$SnO_2$ 37.6 nm | |
| 5 | 3 nm FL | TiN 14.0 nm | ZnO 27.4 nm | Ag 7.8 nm | ZnO 78.0 nm | Ag 13.9 nm | ZnO 33.4 nm | |
| 6 | 3 nm FL | TiN 5.0 nm | $Si_3N_4$ 27.5 nm | Ag 8.4 nm | $Si_3N_4$ 78.0 nm | Ag 12.8 nm | $Si_3N_4$ 33.9 nm | |
| 7 | 3 nm FL | TiN 3.0 nm | $SnO_2$/ZnO 27.5 nm | Ag 16.0 nm | ZnO 88.0 nm | Ag 12.8 nm | ZnO 33.9 nm | |
| Co. Ex. | | | | | | | | |
| 1 | 3 nm FL | ZnO 26.3 nm | Ag 8.0 nm | ZnO 82.0 nm | Ag 13.4 nm | ZnO 35.1 nm | | |
| 2 | 3 nm FL | SS 6.0 nm | $TiO_2$ 10.0 nm | | | | | |
| 3 | 3 nm FL | ZnO 32.0 nm | Ag 9.5 nm | ZnO 77.0 nm | Ag 11.0 nm | ZnO 77.0 nm | Ag 12.5 nm | ZnO 35.0 nm |

Notes:
FL represents transparent float glass.
SS represents stainless steel.

TABLE 2

Single panel characteristics

| | Visible light trans-mittance | Visible light reflectivity (uncoated surface) | Sunlight trans-mittance | Selective trans-mittance perform-ance value | Reflected color (uncoated surface) | Trans-mitted color |
|---|---|---|---|---|---|---|
| In. Ex. | | | | | | |
| 1 | 46.5% | 8.5% | 26.4% | 0.57 | Light green | Colorless |
| 2 | 50.2% | 8.5% | 29.1% | 0.58 | Light green | Colorless |
| 3 | 51.7% | 7.9% | 29.7% | 0.57 | Colorless | Colorless |
| 4 | 65.0% | 8.6% | 32.1% | 0.49 | Colorless | Colorless |
| 5 | 45.0% | 11.7% | 21.5% | 0.48 | Colorless | Colorless |
| 6 | 63.3% | 6.1% | 35.0% | 0.56 | Colorless | Colorless |
| 7 | 57.1% | 11.5% | 28.4% | 0.50 | Yellowish green | Colorless |
| Co. Ex. | | | | | | |
| 1 | 77.5% | 5.8% | 42.5% | 0.55 | Colorless | Colorless |
| 2 | 31.9% | 12.6% | 28.4% | 0.89 | Colorless | * |
| 3 | 71.8% | 6.2% | 34.2% | 0.48 | Colorless | Colorless |

Note: *indicates that the color is explained in the description.

TABLE 3

Multilayer glass panel assembly characteristics

| | Visible light trans-mittance | Visible light reflectivity (exterior side) | Sunlight heat acquisition ratio |
|---|---|---|---|
| In. Ex. | | | |
| 1 | 42.40% | 10.49% | 0.329 |
| 2 | 45.63% | 10.73% | 0.349 |
| 3 | 47.10% | 10.30% | 0.350 |
| 4 | 61.06% | 12.61% | 0.367 |
| 5 | 40.78% | 13.44% | 0.294 |
| 6 | 57.53% | 9.73% | 0.398 |
| 7 | 52.37% | 14.45% | 0.324 |
| Co. Ex. | | | |
| 1 | 68.5% | 10.6% | 0.44 |
| 2 | 28.6% | 13.4% | 0.38 |
| 3 | 65.3% | 10.8% | 0.362 |

According to the present invention, since a mainly Ag film with transparent dielectric films disposed on respective opposite sides thereof mainly passes visible light therethrough and effectively reflects radiations whose wavelengths are longer than the visible light wavelength range thereby to lower the transmittance of the longer-wavelength radiations, the sunlight shielding translucent panel has a selective transmittance capability for selectively transmitting visible light primarily thereto to provide a high visible light transmittance and a high sunlight shielding performance.

Furthermore, because an absorbing layer is present between a composite layer which comprises a mainly Ag film and a transparent dielectric film and a translucent sheet, the thickness of the absorbing layer can be adjusted to adjust the visible light transmittance for allowing the sunlight shielding translucent panel to exhibit a higher sunlight shielding performance. The uncoated surface of the sunlight shielding translucent panel has a colorless, light green, or blue appearance, giving the exterior observer looking at the sunlight shielding glass panel a neat impression about the appearance.

It has been known that the glass panel with the double-Ag-layer LowE film structure composed of five films, i.e., alternately arranged transparent dielectric films and mainly Ag films, disposed on a transparent glass sheet, has a visible light transmittance of about 78%, a sunlight transmittance of about 43%, and a selective transmittance performance value of about 0.55, as shown in Table 2 with respect to Comparative Example 1. However, the present inventor has found that even when the above five films are deposited on an absorbing layer on the transparent glass sheet, the resulting sunlight shielding glass panel still has a good selective transmittance performance value of about 0.55 as shown in Table 2 with respect to Inventive Examples 1–7, and when the thickness of the absorbing layer is adjusted to provide a visible light transmittance of about 50%, the sunlight transmittance can be adjusted to about 0.28 (≈50%×0.55), with the result that the sunlight shielding glass panel according to the present invention has a better sunlight shielding capability than the conventional glass panel with the triple-Ag-layer LowE film structure and also has a relatively high visible light transmittance.

According to the present invention, with two composite layers disposed on the absorbing layer, the sunlight shielding glass panel needs to have only six films on the translucent sheet though the sunlight shielding glass panel has at least the same high sunlight shielding performance and high visible light transmittance as the conventional glass panel with the triple-Ag-layer LowE film structure. Accordingly, the sunlight shielding glass panel is less expensive to manufacture than the conventional glass panel with the triple-Ag-layer LowE film structure, and is as expensive to manufacture as the conventional glass panel with the double-Ag-layer LowE film structure.

If the sunlight shielding translucent multilayer glass panel assembly according to the present invention is used as a window glass panel, then it is effective to reduce a temperature rise in the interior due to sunlight in summertime for thereby reducing the cost of air-conditioning the interior, to keep the interior light during the daytime, and also to reduce heat radiation from the interior to the exterior for lowering the cost of warming the interior. Furthermore, when the sunlight shielding translucent multilayer glass panel assembly, i.e., the uncoated side thereof, is seen from the exterior, since the sunlight shielding translucent multilayer glass panel assembly has an excellent ornamental appearance, it helps make the building in which it is used look attractive and impressive.

Although certain preferred embodiments of the present invention have been shown and described in detail, it should be understood that various changes and modifications may be made therein without departing from the scope of the appended claims.

What is claimed is:

1. A sunlight shielding translucent glass panel comprising:

a translucent sheet;

an absorbing layer disposed on said translucent sheet;

at least one composite layer disposed on said absorbing layer;

an upper transparent dielectric film disposed on said composite layer;

said at least one composite layer comprising a transparent dielectric film and a mainly Ag film composed mainly of silver which are successively arranged in the order named from said transparent sheet; and wherein said absorbing layer comprises a layer of metal having a thickness ranging from 0.3 to 2 nm.

2. A sunlight shielding translucent glass panel according to claim 1, wherein said mainly Ag film has a thickness ranging from 7.5 to 18 nm.

3. A sunlight shielding translucent glass panel according to claim 1, wherein said absorbing layer has a visible light transmittance ranging from 45 to 85%.

4. A sunlight shielding translucent glass panel according to claim 1, wherein said metal comprises at least one selected from the group consisting of chromium, an alloy composed mainly of chromium and nickel, stainless steel, an alloy composed mainly of stainless steel, zinc, niobium, titanium, zirconium, and tungsten.

5. A sunlight shielding translucent glass panel according to claim 1, wherein said at least one composite layer includes an additional layer disposed on at least one surface of said mainly Ag film, said additional layer being made of at least one selected from the group consisting of chromium, an alloy composed mainly of chromium and nickel, stainless steel, an alloy composed mainly of stainless steel, zinc, niobium, titanium, zirconium, and tungsten.

6. A sunlight shielding translucent glass panel according to claim 1, wherein said at least one composite layer comprises a first composite layer and a second composite layer which are successively arranged in the order named from said translucent sheet, the mainly Ag films of the first and second composite layers having a combined thickness ranging from 20 to 30 nm.

7. A sunlight shielding translucent glass panel according to claim 6, wherein the transparent dielectric film of said first composite layer has a thickness ranging from 25 to 50 nm, the transparent dielectric film of said second composite layer has a thickness ranging from 60 to 100 nm, and said upper transparent dielectric film has a thickness ranging from 30 to 45 nm.

8. A sunlight shielding translucent glass panel according to claim 1, wherein the sunlight shielding translucent glass panel has a visible light transmittance ranging from 45 to 65%, and a sunlight transmittance ranging from 20 to 35%.

9. A sunlight shielding translucent glass panel according to claim 1, wherein said translucent sheet comprises a glass sheet which is transparent in at least a visible light wavelength range.

10. A sunlight shielding translucent multilayer glass panel assembly comprising:

a sunlight shielding translucent glass panel according to claim 1; and at least one second translucent sheet disposed in confronting relation to said sunlight shielding translucent glass panel;

said sunlight shielding translucent glass panel and said at least one second translucent sheet being fixed to each other such that said absorbing layer, said composite layer, and said upper transparent dielectric film are interposed between said translucent sheet of the sunlight shielding translucent glass panel and said at least one second translucent sheet.

11. A sunlight shielding translucent glass panel according to claim 1, wherein said absorbing layer has a visible light transmittance ranging from 50 to 80%.

12. A sunlight shielding translucent glass panel according to claim 1, wherein said mainly Ag film has a thickness ranging from 10 to 15 nm.

13. A sunlight shielding translucent glass panel according to claim 1, wherein said layer of metal includes chromium.

14. A sunlight shielding translucent glass panel according to claim 1, wherein said layer of metal includes titanium.

15. A sunlight shielding translucent glass panel comprising:

a translucent sheet;

an absorbing layer disposed on said translucent sheet;

at least one composite layer disposed on said absorbing layer;

an upper transparent dielectric film disposed on said composite layer;

said at least one composite layer comprising a transparent dielectric film and a mainly Ag film composed mainly of silver which are successively arranged in the order named from said transparent sheet; and wherein said absorbing layer comprises a layer of metal having a thickness ranging from 0.5 to 1.8 nm.

16. A sunlight shielding translucent glass panel according to claim 15, wherein said absorbing layer has a visible light transmittance ranging from 50 to 80%.

17. A sunlight shielding translucent glass panel according to claim 15, wherein said mainly Ag film has a thickness ranging from 10 to 15 nm.

* * * * *